United States Patent [19]

Mori et al.

[11] Patent Number: 5,119,212
[45] Date of Patent: Jun. 2, 1992

[54] IMAGE READING APPARATUS

[75] Inventors: Hiroyuki Mori; Tadamasa Mochida; Takashi Koshiyouji, all of Kanagawa, Japan

[73] Assignee: Kabushiki Kaisha Toshiba, Kanagawa, Japan

[21] Appl. No.: 673,156

[22] Filed: Mar. 19, 1991

Related U.S. Application Data

[63] Continuation of Ser. No. 392,558, Aug. 11, 1989, abandoned.

[30] Foreign Application Priority Data

Sep. 28, 1988 [JP] Japan .................. 63-242940

[51] Int. Cl.$^5$ ............................. H04N 1/00
[52] U.S. Cl. ..................... 358/474; 358/401; 355/230; 355/231
[58] Field of Search ........... 358/473, 474, 475, 476, 358/477, 480, 493, 494, 497, 400, 401, 437; 355/70, 71, 230, 231, 75, 120, 115

[56] References Cited

U.S. PATENT DOCUMENTS

| | | | |
|---|---|---|---|
| 3,710,078 | 1/1973 | Lemelson | 235/439 |
| 4,486,786 | 12/1984 | Sato et al. | 358/497 |
| 4,679,155 | 7/1987 | Mitsuka | 358/256 |
| 4,689,693 | 8/1987 | Watanabe | 358/497 |
| 4,782,369 | 11/1988 | Yasuda et al. | 355/120 |
| 4,816,921 | 3/1989 | Akiyama et al. | 358/256 |
| 4,831,457 | 5/1989 | Watanabe et al. | 358/476 |
| 4,870,294 | 9/1989 | Hasegawa | 358/494 |
| 4,879,604 | 11/1989 | Koshiyouji | 358/494 |
| 4,893,196 | 1/1990 | Koshiyouji et al. | 358/474 |
| 5,012,353 | 4/1991 | Yoshino et al. | 358/401 |

FOREIGN PATENT DOCUMENTS

| | | | |
|---|---|---|---|
| 0183980 | 6/1986 | European Pat. Off. | 358/473 |
| 56-167159A | 12/1981 | Japan | 355/231 |
| 0141075 | 8/1983 | Japan | 358/474 |
| 0095773 | 6/1984 | Japan | 358/474 |
| 129829A | 1/1989 | Japan | 355/231 |
| 258078A | 2/1990 | Japan | 355/231 |

Primary Examiner—Edward L. Coles, Sr.
Assistant Examiner—Jerome Grant
Attorney, Agent, or Firm—Finnegan, Henderson, Farabow, Garrett and Dunner

[57] ABSTRACT

An image reading apparatus reads imae data from an original document when a carriage supporting a line image sensor reciprocates along an original document. When the image reading apparatus is transported, the carriage is secured to the apparatus so that it will not be moved due to vibrations and impacts. A safety device is installed on the reading apparatus so that the apparatus may not be operated with the carriage secured. The safety device checks whether or not the carriage is secured by use of a switch. When the carriage is secured, the safety device turns off the power supplied to the carriage. The safety device also turns off the power supplied to the light source when the carriage securing cover is removed to replace the light source.

5 Claims, 4 Drawing Sheets

IMAGE READING APPARATUS

This application is a continuation of application Ser. No. 07/392,558 filed Aug. 11, 1989, now abandoned.

BACKGROUND OF THE INVENTION

1. Field of the Invention

This invention relates to an image reading apparatus used for printers and facsimile machines.

2. Description of the Related Art

The type of image reading apparatus disclosed herein is equipped with a transparent table on the surface of the apparatus. A reading means is contained in the apparatus which moves along the transparent table to read a document set onto the table.

The reading means comprises a carriage moving along the 1 table, a light source installed on the carriage to illuminate the original, and a photoelectric conversion means to convert the light reflected from the original into an electric signal. An example of such an image reading apparatus is shown in U.S. Pat. No. 4,689,693 (Patented Aug. 25, 1987).

In this type of image reading apparatus, the light source and photoelectric conversion means must not be damaged and the carriage must not be misaligned due to vibrations and impacts during the transport of the apparatus.

Therefore, during transport, the carriage is secured to the apparatus through a securing means before the apparatus is shipped from the factory. This securing means must be removed from the apparatus before the apparatus is operated. However, sometimes the apparatus is accidentally operated with the securing means installed. When this happens, the motor which drives the carriage will be overloaded, resulting in damage to the motor and driving system.

SUMMARY OF THE INVENTION

It is an object of the present invention to provide an image reading apparatus designed to prevent the driving system from being operated with the carriage. secured, so that the motor and driving system will not be damaged.

The image reading apparatus according to this invention comprises a document support means for supporting an original document, reading means movable along the document support means for reading image data on the original document, driving means for moving the reading means, securing means for preventing movement of the reading means, and control means for prohibiting operation of the driving means when the securing means is in place to prevent movement of the reading means.

BRIEF DESCRIPTION OF THE DRAWINGS

An embodiment of this invention will now be described by way of examples and with reference to the accompanying drawings, in which.

DETAILED DESCRIPTION OF THE PREFERRED EMBODIMENTS

Figure 1:
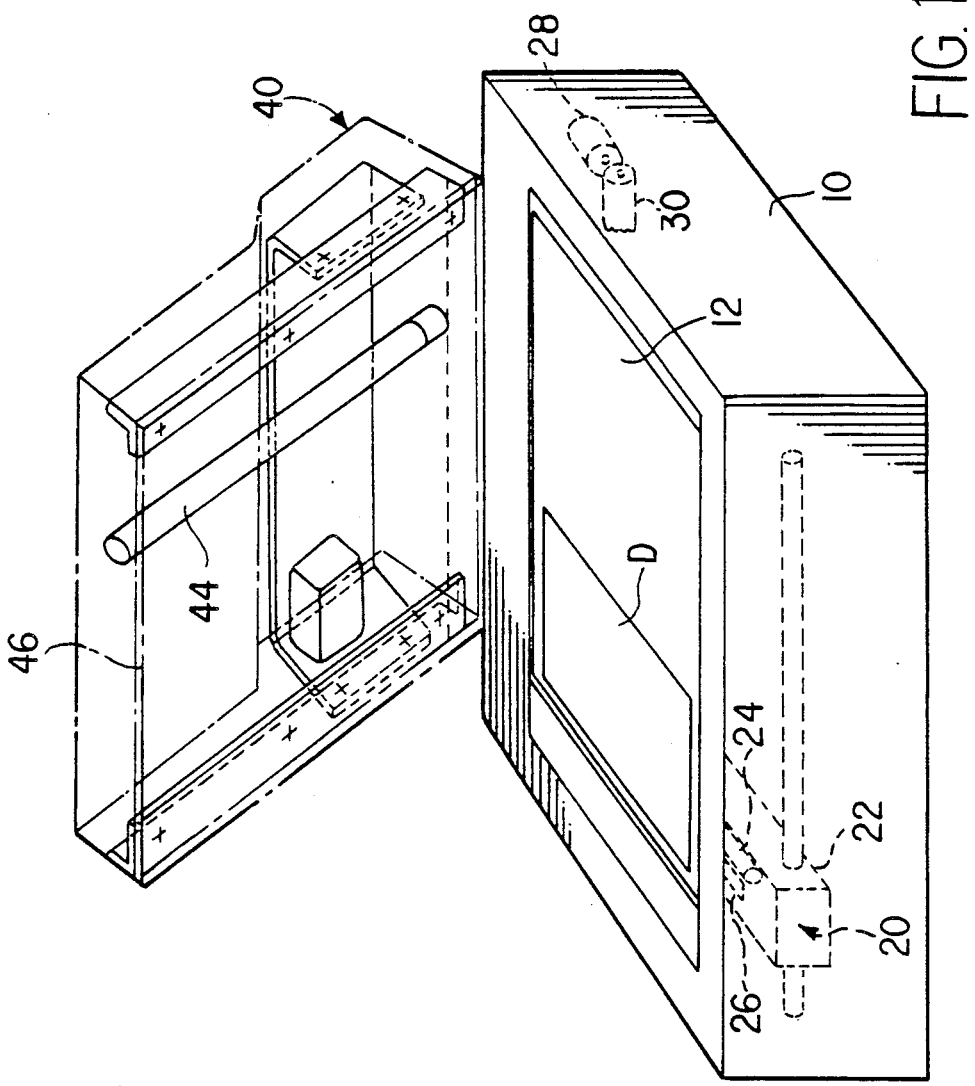
FIG. 1 is a front view of the apparatus.

Referring now to FIG. 1, a document support means (12) is installed on the top of the apparatus (10). The document support means is comprised of transparent glass onto which an original document D is placed. A reading means (20) is installed in the apparatus (10), which is movable along the document support means (12) to read the original document D set thereon.

The reading means (20) includes a carriage (22) and a light source (24) installed on the carriage (22) to illuminate the original document D. The reading means (20) also includes a line image sensor (26) to convert the light reflected from the original document D into electric signals. The carriage (22) is moved along the document support means (12) by a driving means comprised of a motor (28) and a timing belt (30). The apparatus (10) contains a digital circuit to control the entire apparatus, an analog circuit to process the output signal from the reading unit (20), an interface circuit to connect the apparatus (10) with other equipment, and a power circuit for these circuits.

Figure 2:
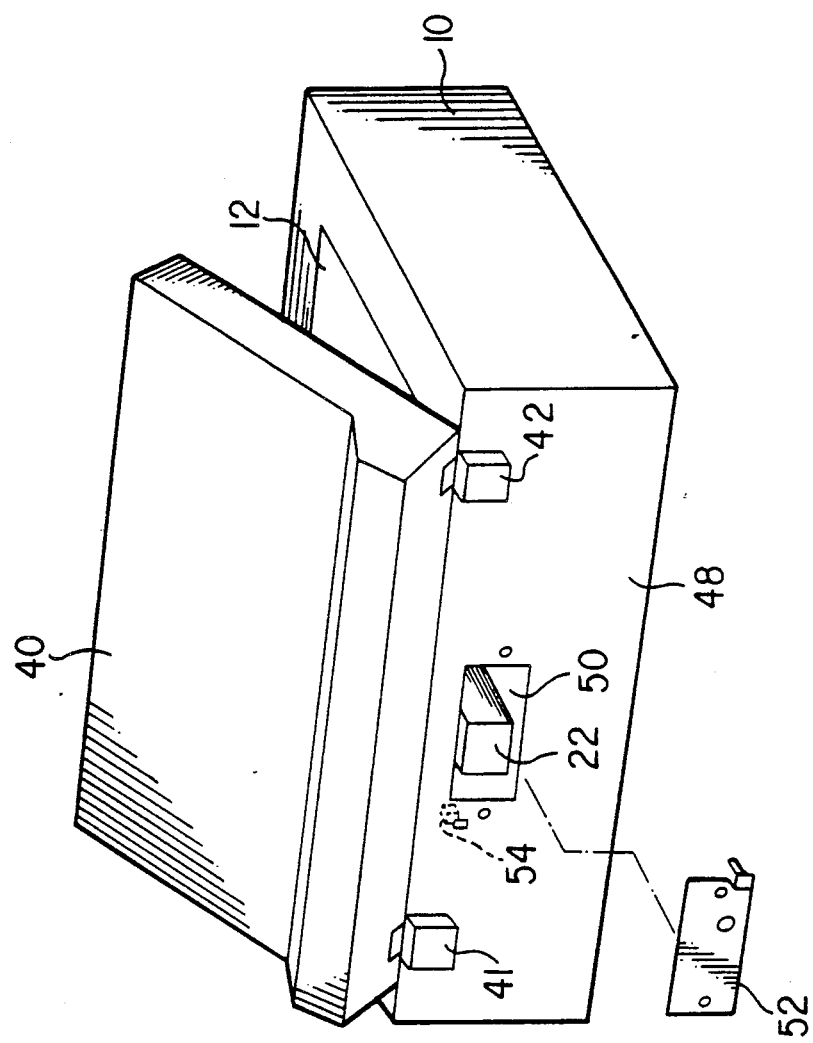
FIG. 2 is a rear view of the apparatus.

A cover unit (40) to cover the document support means (12) is installed on the top of the apparatus (10). The cover unit (40), as shown in FIG. 2, is installed on the apparatus (10) with hinges (41) and (42) so that it can freely be opened or closed.

The cover unit (40) contains a light source (44) to illuminate the document support means (12). The light source (44) is moved along the original document D by a driving means (not illustrated). The light source (44) is moved synchronously with the reading unit (20) to read the original.

An image reading apparatus with the above configuration is shown in U.S. Pat. No. 4,879,604 and U.S. Pat. No. 4,893,196 which were also filed by one of the inventors of this invention.

A white plate (46) is installed in the cover unit (40) opposite to the document support means (12). The white plate (46) is made of, for example, translucent acrylic resin.

The white plate (46) is used to press the original against the document support means (12) and evenly distribute the light from the light source (44) when the cover unit (40) is closed.

An opening (50) is formed on the rear panel (48) of the apparatus (10) close to the carriage (22), as shown in FIG. 2. The opening (50) is covered with a detachable cover (52). An electric switch (54) is installed near the opening (50). The actuator (55) of the switch (54) is embedded into the apparatus (10) as mentioned later. The switch (54) is connected to the power control circuit to turn on/off the power supply of the driving system.

Figure 3:
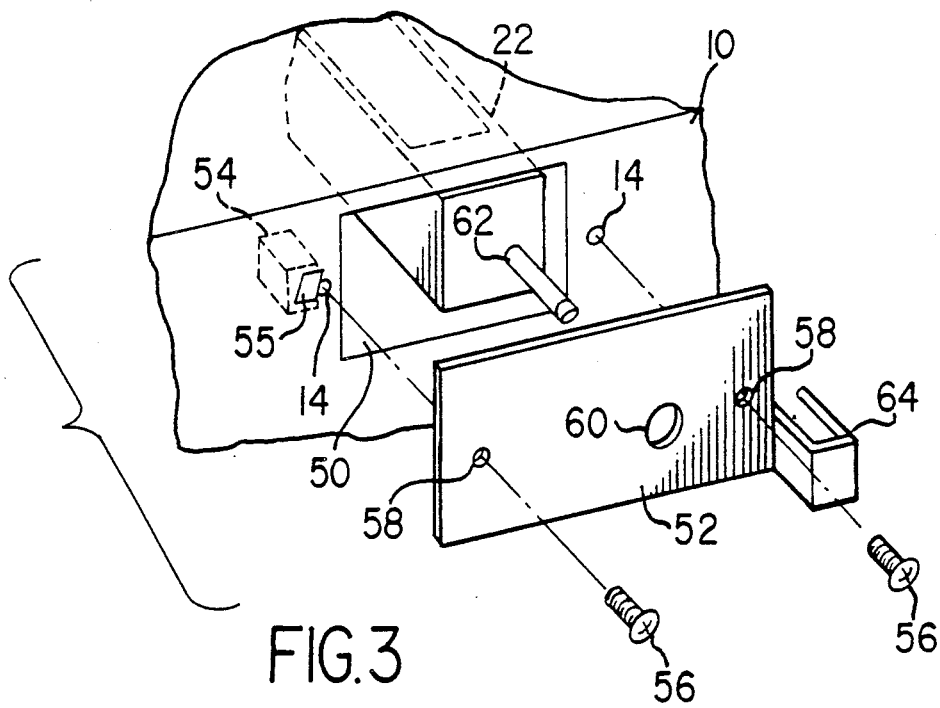
FIG. 3 is a schematic view showing the reading means when secured.

Referring now to FIG. 3, the cover (52) is used to secure the carriage (22) to the apparatus (10) when the apparatus (10) is transported. Through-holes (58) are provided at both ends of the longer side of the cover (52). The position of the through-holes (58) corresponds to the tapped holes (14) in the apparatus. When the through-holes (58) are aligned with tapped holes (14), screws (56) will join cover (52) to the apparatus (10). A through-hole (60) is installed at a position off-center between the through-holes (58) of the cover (52). The through-hole (60), for example, deviates toward one through-hole (58) and downward.

To transport the apparatus (10), a pin (62) is installed on the carriage (22) through the opening (50) as shown in FIG. 3. The pin (62) is installed at a position lower than the line connecting the tapped holes (14) and corresponds to the through-hole (60).

Therefore, to secure the carriage (22) it is possible to install the cover (52) only in the orientation shown in FIG. 3. The pin (62) passes through the through-hole (60) of the cover (52) before the cover (52) is secured to the apparatus (10) with the screws (56). As a result, the carriage (22) is secured to the apparatus (10) by the cover (52).

When the cover (52) is installed in the direction shown in FIG. 3, the switch (54) remains turned off because the cover (52) does not contact the actuator (55) of the switch (54). Therefore, power is not supplied to the driving system of the carriage (22) or the light source (24).

Figure 4:
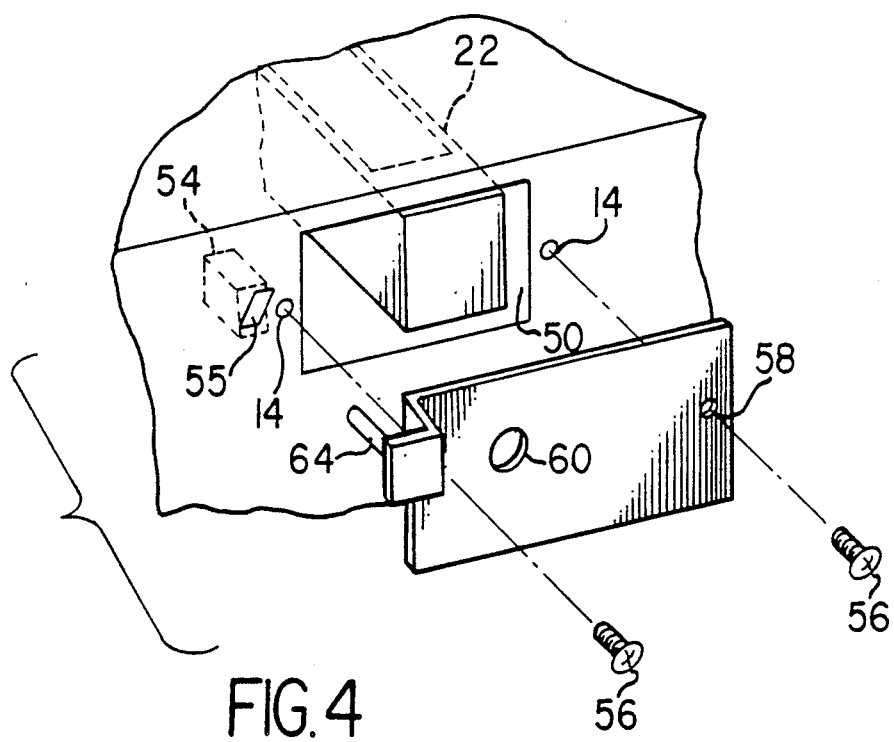
FIG. 4 is a schematic view of the reading means when not secured.

The following describes the operation required to release the carriage (22) from the secured condition and make it ready for operation. First, the cover (52) is removed from the apparatus (10) and the pin (62) is removed from the carriage (22). Then, the cover (52) is rotated by 180°, as shown in FIG. 4, and it is again secured to the apparatus (10). Thus, projection (64) advances through a hole (not illustrated) on the rear panel (48) into the apparatus to press the actuator (55) of the switch (54).

As a result, the switch (54) is turned on. This allows power to be supplied to the driving system of the carriage (22) and the light source (24) and the read operation may be carried out. The operation of the power control circuit which controls this operation will now be described.

Figure 5:
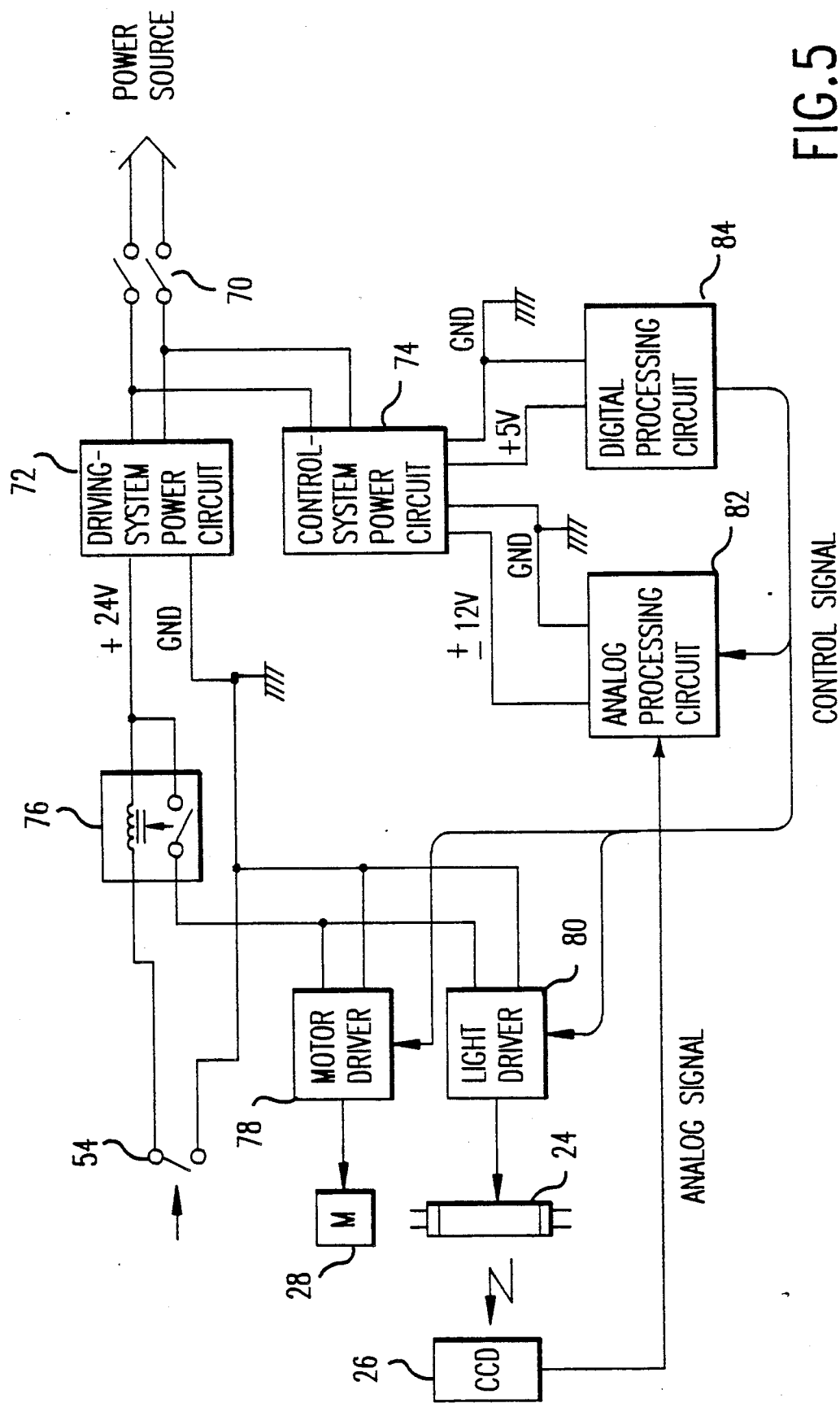
FIG. 5 is a block diagram of the electrical control for the driving system.

Referring to FIG. 5, electric power is supplied to a driving-system power circuit (72) and a control-system power circuit (74) through a power switch (70). A coil of the relay (76) is connected to the output of the driving-system power circuit (72) through the switch (54).

A driving circuit (78) of the motor (28) and a light driver (80) of the light source (24) are connected in parallel to the output of the driving-system power circuit (72) through the contact of relay (76).

When the switch (54) is closed, the contact of the relay (76) is closed. Therefore, the motor driving circuit (78) and the light source light driver (80) are activated only when the switch (54) is turned on.

An analog processing circuit (82) and a digital processing circuit (84) are connected to the output of the control-system power circuit (74). These processing circuits (82) and (84) control the motor driving circuit (78) and the light driver (80). The output signal of the line image sensor (26) is supplied to the analog processing circuit (82) to be processed.

The above embodiments provide that no power will be supplied to the driving system of the carriage (22) when the carriage (22) is secured by the cover (52) because the switch (54) is open. Therefore, it is possible to prevent the driving system from being damaged when the carriage is secured by pin (62).

The following describes the operation to replace the light source (24) of the reading unit (20). Replacement of the light source (24) is carried out through the opening (50) by removing the cover (52). In this case, when the cover (52) is removed, the switch (54) is turned off.

As a result, no power is supplied to the driving system of the carriage (22) and the light source (24). Therefore, the light source (24) can safely be replaced.

In addition, the switch (54) indicates whether the carriage is secured and whether the cover (52) is present when the light source (24) is replaced. Therefore, it is also possible to decrease the number of parts required in the apparatus.

Further, because the through-hole (60) is installed at a position other than the center of the cover (52), the projection (64) is always brought to a position opposite switch (54) when the carriage (22)is secured. Therefore, it is also possible to prevent erroneous installation of the carriage locking mechanism.

Other embodiments of the invention will be apparent to those skilled in the art from consideration of the specification and practice of the invention disclosed herein. It is intended that the specification and examples be considered as examplary only, with the true scope and spirit of the invention being indicated by the following claims.

What is claimed is:

1. An image reading apparatus for reading image data from a document, comprising:
   means for supporting the document;
   means for reading the image data from the document, the reading means being movably supported along the means for supporting;
   means for electrically driving the reading means;
   means for housing the reading means and driving means, including an opening in the housing means to provide access to the reading means;
   means for covering the opening in the housing means, the covering means preventing movement of the reading means by physical contact; and
   means for prohibiting operation of the driving means when the covering means prevents movement of the reading means.

2. The image reading apparatus according to claim 1, wherein the prohibiting means includes means for detecting when the covering means prevents movement of the reading means, and means for disconnecting the power supplied to the driving means when the detecting means detects that the covering means prevents movement of the reading means.

3. The image reading apparatus according to claim 1, wherein the reading means includes means for illuminating the document and means for receiving the light from the document illuminated by the illuminating means, and
   the prohibiting means includes means for prohibiting operation of the illuminating means when the covering means prevents movement of the reading means.

4. The image reading apparatus according to claim 3, wherein the illuminating means may be replaced through the opening in the means for housing.

5. The image reading apparatus according to claim 1, wherein the covering means is positionable to cover the opening in a first alignment which prevents movement of the reading means and is positionable to cover the opening in a second alignment which allows movement of the reading means, and the means for prohibiting operation of the driving means is structured to allow operation of the driving means when the covering means is positioned so as to allow movement of the reading means.

* * * * *

UNITED STATES PATENT AND TRADEMARK OFFICE
CERTIFICATE OF CORRECTION

PATENT NO. : 5,119,212

DATED : June 02, 1992

INVENTOR(S) : Hiroyuki MORI et al.

It is certified that error appears in the above-identified patent and that said Letters Patent is hereby corrected as shown below:

On the title page, Item:
   Abstract, line 1, change "imae" to --image--.

Signed and Sealed this

Twenty-sixth Day of October, 1993

*Attest:*

BRUCE LEHMAN

*Attesting Officer    Commissioner of Patents and Trademarks*